United States Patent
Wolf et al.

[11] Patent Number: 6,116,832
[45] Date of Patent: *Sep. 12, 2000

[54] SCREW WITH ELASTOMER COMPONENT TO PROVIDE VIBRATIONAL DECOUPLING

[75] Inventors: Franz Josef Wolf; Eric Portal, both of Bad Soden-Salmünster; Manfred Schatz, München; Axel Temmesfeld, Raubling, all of Germany

[73] Assignees: WOCO Franz-Josef Wolf & Co., Bad Soden-Salm unster; Bayerische Motoren Werke Aktiengesellschaft, Munich, both of Germany

[*] Notice: This patent issued on a continued prosecution application filed under 37 CFR 1.53(d), and is subject to the twenty year patent term provisions of 35 U.S.C. 154(a)(2).

[21] Appl. No.: 08/914,231

[22] Filed: Aug. 19, 1997

[30] Foreign Application Priority Data

Aug. 20, 1996 [DE] Germany .............................. 196 33 578

[51] Int. Cl.⁷ ...................................................... F16B 35/02
[52] U.S. Cl. ............................ 411/383; 411/302; 411/412; 411/900
[58] Field of Search ...................................... 411/900, 383, 411/392, 393, 396, 411, 412, 424, 301–304, 386, 387.1, 387.4

[56] References Cited

U.S. PATENT DOCUMENTS

| | | |
|---|---|---|
| Re. 33,901 | 4/1992 | Shinjo et al. .................. 411/387.1 |
| 2,663,344 | 12/1953 | Burdick ..................... 411/302 |
| 3,109,691 | 11/1963 | Burkhardt ................. 411/412 |
| 3,350,811 | 11/1967 | Bender ..................... 411/412 |
| 3,501,993 | 3/1970 | Swanson ................... 411/393 |
| 3,584,821 | 6/1971 | Glebe . |
| 4,019,550 | 4/1977 | DeHaitre . |
| 4,170,180 | 10/1979 | Houston . |
| 4,367,793 | 1/1983 | MacIntosh . |
| 4,449,329 | 5/1984 | Sauerwein . |
| 4,461,119 | 7/1984 | Smith . |
| 4,538,697 | 9/1985 | Muroi . |
| 4,900,207 | 2/1990 | MeGovern ................. 411/383 |
| 5,129,388 | 7/1992 | Vignaud ................... 411/393 |
| 5,195,859 | 3/1993 | Thornton . |
| 5,547,324 | 8/1996 | Durr ........................ 411/418 |
| 5,785,476 | 7/1998 | McDonnell ................ 411/383 |

FOREIGN PATENT DOCUMENTS

| | | | |
|---|---|---|---|
| 113394 | 2/1918 | United Kingdom ............. 411/393 |
| 743140 | 1/1956 | United Kingdom ............. 411/393 |
| 1062372 | 3/1967 | United Kingdom ............. 411/393 |

*Primary Examiner*—Flemming Saether
*Attorney, Agent, or Firm*—Lowe Hauptman Gopstein Gilman & Berner

[57] ABSTRACT

The screw of the invention is characterized by a threaded shank of which the foot segment is an elastomer and of which the head segment is a dimensionally stable material, preferably a plastic. The screw comprising an elastomer buffer integrated into it in this manner is used to decouple vibrations from two components to be connected without having to resort to any further accessory means. Preferably the screw is used as a locking screw and foremost is applicable to affix a motor vehicle water radiator to a base.

12 Claims, 3 Drawing Sheets

SCREW WITH ELASTOMER COMPONENT TO PROVIDE VIBRATIONAL DECOUPLING

BACKGROUND OF THE INVENTION

The invention concerns a basically conventional screw having a head, a foot and a shank fitted with an outer thread.

Screws are nearly ideal connectors and fasteners because being detachable but nevertheless providing solid, geometrically interlocking connections and ties. The screw's connection principle is based in that it connects and affixes the two components or elements of the screw connection to be joined in either directly geometric interlocking manner or indirectly via nuts locking at least onto the screw shank, most even directly and in fixed manner.

This mechanically nearly ideal species of connection suffers from the drawback of being an excellent acoustic conductor. As a result innumerable configurations, methods and devices already are known to damp the sound transmitted in and through screw connections, short of decoupling them entirely. The problems encountered in such attempts to acoustically insulate screw connections are so many that they need not be comprehensively listed here. Known means for damping sound in solids as occurring in screw connections include excessive bulk where buffers are concerned, complex assembly when using differential techniques and using several individual parts to make an acoustically damping screw connection, or only moderately dynamic strength of the insulation having thinner damping elements, for instance relatively thin rubber linings, all are known drawbacks for such known acoustic damping in solids relating to screw connections.

SUMMARY OF THE INVENTION

In the light of the state of the art, it is the object of the invention to create a screw for screw connections, said screw effectively acoustically decoupling the screw connection when made and offering a long service life, and allowing assembly without additional and time-consuming labor and requiring only minimal height.

The invention achieves its goal by a screw into which a decoupling and damping rubber buffer is already directly integrated. This integration is implemented in such manner by the invention that the rubber buffer directly forms a part of the screw shank, being the screw's foot.

Depending on the design of the junction of the rubber buffer segment of the screw shank width and of the undeforming screw-shank segment, the screw can be both tensively and compressively loaded axially, and, with appropriate design of the junction, can also be stressed radially in the zone between the elastic and the rigid shank segments.

As a rule however the screw of the invention is applicable to those screw connections wherein at least the rubber buffer segment of the screw shank is compressively loaded in the axial direction. Typical examples of such screw connections are locking screw connections or set screw connections for which vibration decoupling is desired.

A significant design factor of the screw is to fit the rubber buffer, serving as the foot of the screw shank and of which the axial height as a rule is between ⅓ and ⅔ of the total length of the screw shank, with an outer thread evincing the at least essentially same properties as the rigid and geometrically locking thread at the top side of the screw. This feature is required when the rubber-buffer/screw-foot of the screw of the invention shall not require additional bulk or additional elements. Therefore the rubber buffer must be designed in such manner that, just as the screw shank made of dimensionally stable plastic, it also can be made to pass through the corresponding thread borehole or thread hole which is to be permanently entered by the locking screw.

In one advantageous embodiment of the invention the thread is designed in such a way that the thread shall be flat in the shank's elastomer segment and it shall be trapezoidal in the shank's plastic segment. In this manner the mere thread configuration of each of the two parts of the compound screw shank optimally matches its application. While the trapezoidal thread reliably secures the screw even against applied load in the thread-borehole of one of the two components to be joined, the flat thread assures the transverse dimensional stability of the rubber buffer formed by the foot when the screw's elastomer part is axially compressed, for instance in a correspondingly designed cup-like rest.

In principle both parts of the shank of the screw of the invention, namely the rigid and the elastic shank segments, may be arbitrarily combined into a compound structure. Vulcanizing the elastomer onto or into the plastic can be implemented by the method of the so-called "binary compounds" or in any other arbitrary manner. Undercuts or eyes of the rigid material may be vulcanized into the elastomer to achieve better anchoring and firm irrotationality.

Preferably however this connection of the elastomer thread segment to the plastic thread segment is implemented by geometric interlock. For that purpose one embodiment of the invention provides that the rigid shank segment is fitted from the radial junction in the thread as far as the screw foot, with an axially projecting geometric interlock jaw which in the vicinity directly below the junction comprises an annular constriction which can be entered by a geometric interlock bead of the elastomer segment. This geometric interlock jaw moreover comprises a grooved clearance running in the direction of the diameter of the shank and also open toward the screw foot. Following the geometric interlocking of the elastomer part, a rise projecting in complementary manner toward the screw head will enter said clearance. By means of this saddle-rider interlock, very effective irrotationality is achieved between the shank elastomer segment that was interlocked while elastically prestressed and the rigid shank segment on the head side of the screw. This sort of geometric interlock to implement the compound shank not only means problem-free and quick manufacture of the components of the combined screw, but also makes possible permanent, dimensionally stable assembly of the screw shank, again in problem-free manner.

When assembling an operative screw by geometric interlocking in the above described manner, care must be paid that the elastic shank segment and the rigid shank segment are assembled in such a mutual radial angular position that the thread flanks shall mesh smoothly. "Smoothly" means in this context that the pitch and the thread flanks when passing from the elastic shank segment to the rigid shank segment will run continuously without axially discontinuous gaps. On the other hand the formation of a radial gap at the transition from the elastic flank of the screw foot segment to the rigid flank of the screw head segment is entirely appropriate in order to reliably preclude jumps and overlaps in this transition zone even when accepting larger manufacturing tolerances.

This means that the appropriate assembly of two separately prefabricated shank segments can take place in only one relative angular position of the two segments. The above described simple saddle-rider connection to assure mutual irrotationality of the two shank segments in the simplest case is such that it still allows assembling the two shank segments in two angular positions apart by 180°. While one of these two assembly positions is the proper one and therefore results in a continuous thread flank, the other diametrically opposite position results in an axial jump in thread flank and hence in useless products. This simple design therefore is unobjectionable for manual assembly during which the proper continuous thread operation is at once visually evident and adjustable. However as regards machine mass production, one embodiment of the invention comprises, in addition to the above described simple center-symmetrical saddle-rider system, generally operating rotationally non-symmetric and in each case mutually spatially complementary unique projections and recesses on and in the junction-surface, respectively, to allow flush assembly of the two shank segments in only one radial relative angular position. The concept of "unique projections and recesses" may also be construed that these are shapes of solid geometry evincing a 360° or "unique" symmetry of rotation, that is, not being 180° or "dually" rotationally symmetric in the manner of the above simple saddle-rider sub-system, to assure irrotationality.

Such single complementarily interlocking elements in the junction surface between the two shank segments illustratively may be axial sub-systems of groove/guide-ridge or a guide pin guided in an axial groove or a guiding half-sphere in the junction surface or, in the radial plane, they also may be a saddle-rider sub-systems which however require unique symmetry of rotation, that is, they may not evince central symmetry. Because the sole formation of such eccentric saddle-rider systems as the single means to assure irrotationality however would lead to stresses in the shank, such complementing eccentric saddle-rider systems to create a single symmetry of rotation preferably are used together with a sturdy and center-symmetric saddle-rider system to assure reliable and mutual irrotationality of the two shank segments.

To assure the junction between the two shank segments shall come together 100% free of defects when the junction angle is set in automated assembly, preferably a combined system of an axial groove/guide-ridge sub-system and a radial eccentric saddle-rider sub-system shall be used. The axial groove/guide-ridge serves to radially align the two shank segments to be connected by geometric interlocking before and until the beginning of interlocking as well as to preserve the found junction angle after the beginning of geometric interlock. If nevertheless during the automatic initiation of the geometric interlock a radially projecting and axially pointing guide rise at the lower edge of the surface pin should be inserted, on account of faulty sensor interpretation for instance, into a non-assigned groove but instead, on account of compression, onto a segment of the cylindrical inside surface of the shank elastomer segment not foreseen for that purpose, then the eccentric saddle-rider sub-system formed in the radial plane in the bottom zone of the junction surface will act as an alarm signal during the ensuing quality control because the two segments of the screw shank cannot be assembled, because of the blocking generated by this improperly joined eccentric saddle-rider system, to assume the rated dimensions. In this manner defectively assembled screws will evince easily observed excess length in mass-produced assembly. Such excess-length screws caused by defective assembly are easily removed from the manufacturing process, can be automatically separated and may be fed back for the purpose of being joined without incurring any losses of material.

Be it emphasized here once more that the screw of the invention is widely applicable technically and functionally, for instance as a screw to vibrationally separate structural parts which are tensively stressed or to affix transversely mutually loaded structural parts without allowing vibrations passing from one to the other of said structural parts.

In addition however the screw of the invention is expected to be especially well suited in making vibration-insulated connections in the manner of a lock-screw connection. For that purpose one of the two structural parts to be joined together illustratively comprises a screw borehole in a given position to pass the screw of the invention to be screwed tight. The component to be affixed for instance is held on a support base and comprises, axially underneath the above structural part, a recess or a cup-shaped or a blind-hole rest receiving the elastomer foot and transmitting the exerted foot force axially and moreover preventing excessive transverse deformation of said elastic screw foot. In such a configuration of a vibration-decoupled or vibrationally insulating connection of two structural parts and acting against a rest in rotation-immobilizing manner there is no need to rotate the screw as deep as its collar stop into the screw-in borehole, rather it can and will be tightened on account of defined constraints only until it reaches a predetermined limit torque. This limit torque is set by the particular axial compression of the foot of the affixation screw. In this manner one achieves a vibration-insulating screw which also opens up wholly new ways for making connections: the limit torque of the screw connection using the screw of the invention can be adjusted far more accurately than in conventional rigid screws on account of the larger available angle of rotation per unit of torque, that is on account of the shallower spring characteristic of the screw of the invention.

The screw of the invention is used in practice foremost to affix cooling components in the engine compartment of motor vehicles. For that purpose the engine water radiator is set flat and pivotable on a lower elastomer bearing and pivoted up into its vertically defined position and thereupon is affixed through a thread hole in the body sheet metal by means of a screw of the invention in such manner that it is stressed against its base bearing and secured against tipping, without body sound being transmitted by such frictional and positive locking.

The invention is elucidated below in relation to illustrative embodiments.

DETAILED DESCRIPTION OF THE INVENTION

Figure 1:
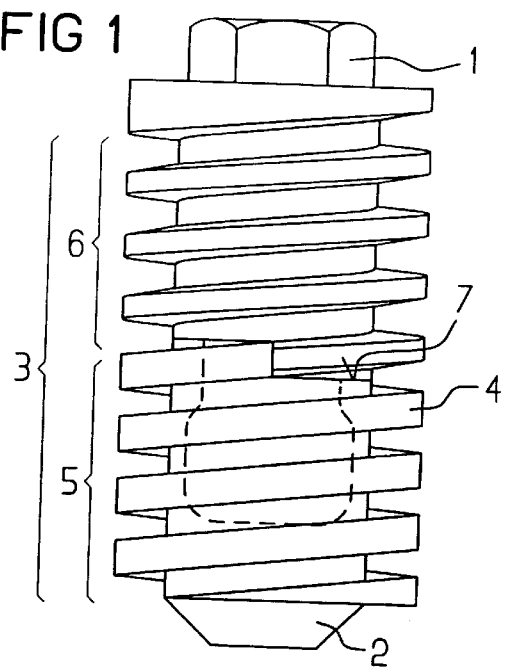
FIG. 1 is a side view of the assembly of a screw of the invention, the geometric interlocking conditions not visible per se being indicated by contours for elucidation.
Figure 7:
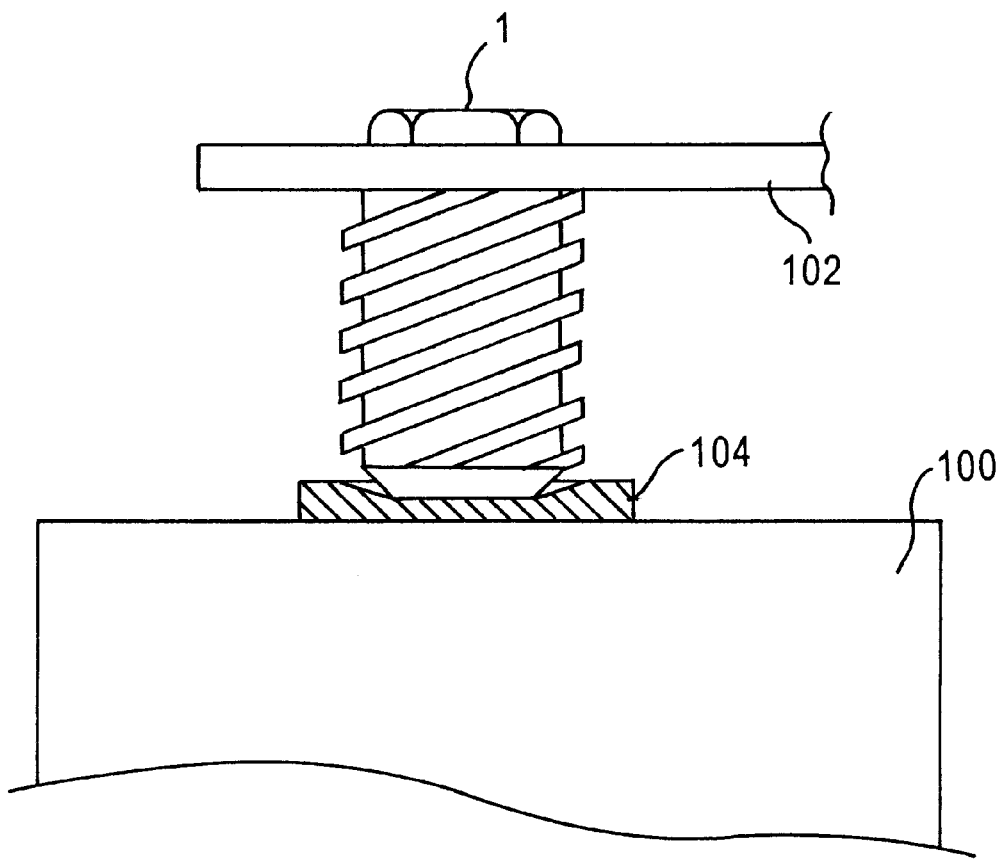
FIG. 7 shows a plan view of the invention for mounting an automotive radiator.

FIGS. 1 and 7 shows a first illustrative embodiment of the screw of the invention designed to affix automotive radiators 100 to a sheet metal 102 with a cup-shaped bearing 104. The essential components of the screw are a head 1, a foot 2 and a shank 3 fitted with a thread 4. The screw is composed of two different materials, namely an elastomer forming the foot segment 5 of the shank 3 and a dimensionally stable material in the head segment 6 of the shank 3 and also forming the screw head 1. The elastomeric foot segment 5 is about half the length of the total shank 3. Depending on the application, this elastomer segment 5 may be shorter or longer than shown in FIG. 1, however preferably it shall be axially from ⅓ to ⅔ of the total length of the shank 3.

Both the head segment 6 and the head 1 of the screw shown in FIG. 1 are integral, in this instance as an injection-molded plastic part.

Figure 2:
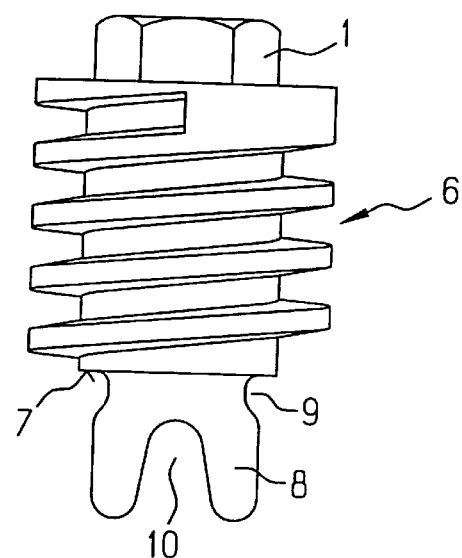
FIG. 2 shows the head of the screw-shank and the near head zone together with the geometric interlock jaw prior to being interlocked into the elastomer segment of the screw shank.
Figure 3:
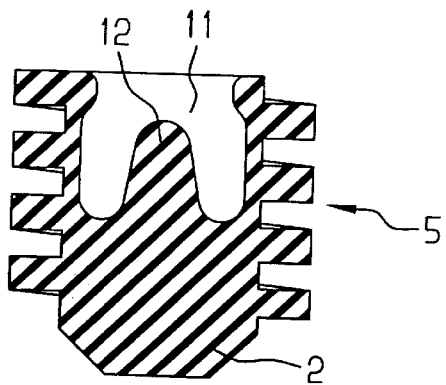
FIG. 3 is an axial section of the shank's foot section consisting of an elastomer prior to being interlocked into the rigid portion of the screw shown in FIG. 2.

As clearly shown by FIGS. 2 and 3, and as furthermore indicated in FIG. 1, the two shank segments 5, 6 are irrotationally joined together by a mutual geometric interlock means.

In the design shown in FIG. 2, an interlock jaw projecting downward away from the head part 6 is present below the partition plane 7 between the foot part 5 and the head part 6 and comprises in its segment near the head an annular groove 9 to geometrically interlock the foot part 5 and it moreover contains a radial, continuous channel 10 which is open toward the end of the foot. The effective junction surface of the two screw segments therefore is defined by the total surface of the interlock jaw 8 and by the areas of the head segment 6 lying the partition plane 7.

The outer contour of the interlock jaw 8 at the head segment 6 of the shank 3 follows the junction surface being topologically complementary to the inside wall of a recess 11 (FIG. 3) in the elastic foot segment of the shank, in addition a radial and continuous rise 12 is present in said recess 11 projecting toward the screw's head segment 6 and entering, in surface-against-surface contact, said recess 10 of the interlocked jaw 8 and by the formation so entailed of a fixed saddle-rider connection precluding mutual rotation between the head segment 6 and the foot segment 5 of the shank 3. The geometric interlock is so rigid that torques up to 5 to 6 Nm may be applied to the head 1 without mutual rotation of the two shank segments taking place. Such torques are much higher than those required for the torques implementing adequate practical compression of the foot segment 5.

FIG. 1 most clearly shows the total screw shank 3 with a continuous and constant thread of uniform pitch and evincing substantially uniform characteristics over the entire shank. However, whereas these threads are trapezoidal in the head segment 6 of the shank, the thread in the foot segment 5 is a flat thread. This differentiation meets the particular tasks awaiting the two segments of the compound screw.

Accordingly the thread in the head segment of the shank must assure a fixed and load-resistant seat in the screw-in thread, that is, is must absorb comparatively large forces through the thread flanks.

Contrary to the above, the foot segment 5 of the shank 3 in the case discussed in the embodiments of a locking screw must absorb a substantially noticeable axial compressive stress without on that account evincing instabilities. When the foot segment 5 of the shank 3 is compressed by an axial load, the flanks of the flat thread obviously meet both purposes, namely both radial stabilization and improvement in axial load capacity by means of the effective increase in cross-section.

Figure 4:
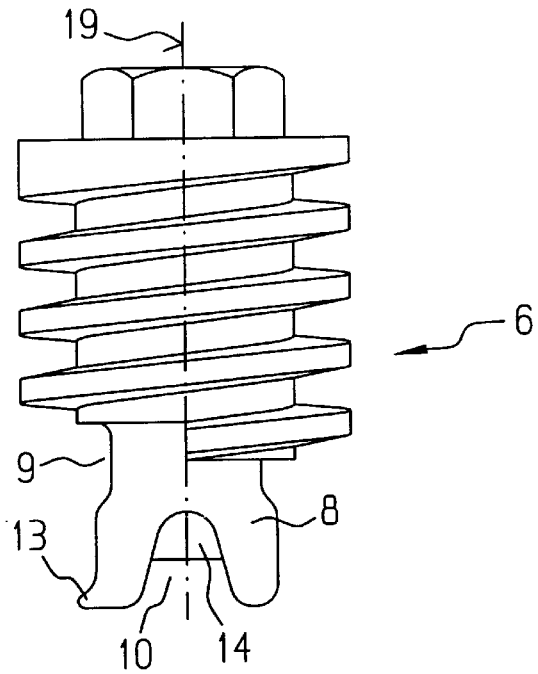
FIG. 4 shows the rigid head section of a second illustrative embodiment of the invention similar to the representation of FIG. 2.

The illustrative embodiment of 4 through 6 shows a screw with features of the invention and especially well suited for automated, strictly machine-operated assembly by geometric interlock. In addition to the above discussed center-symmetrical, saddle-rider irrotationality means 12, 10 shown in FIGS. 1 through 3, the interlock jaw 8 of FIG. 4 evinces on one hand a radially outward projecting guide ridge 13 and on the other hand an eccentrically mounted ridge or torque 14 pointing axially downward toward the screw's foot into the rider recess 10.

When the rigid head segment 6 is assembled in the proper angular geometric interlock to the elastic foot segment 5, the junction jaw 8 can be inserted only in a singly defined angular position in the absence of deforming applied force into the receiving recess 11 FIGS. (5, 6) when the guide ridge 13 is guided at the proper angle through an axial guide groove 15 formed in the bead ring 16. This bead ring 16 serves to engage the annular groove 9 at the head segment 6 to axially affix both screw segments after the connection by geometric interlock has been made. This purpose also is addressed by a clearance 17 in the surface zone near the base of the clearance 11 in the foot segment 5. For that purpose the ridge 13 is dimensioned in such a way that when the interlock jaw 8 geometrically interlocks the receiving clearance 11, said spring will radially slip downward even after passing through the guide groove 15 while being moderately radially prestressed against the inside surface of the clearance 11.

Figure 5:
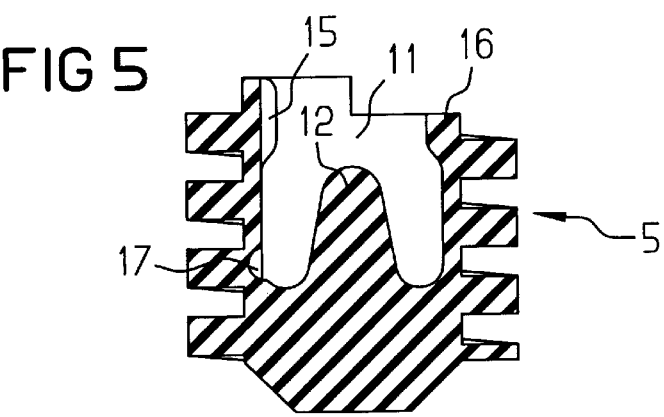
FIG. 5 shows an elastomer foot segment complementary to the head segment shown in FIG. 4 and in a representation corresponding to that of FIG. 3.
Figure 6:
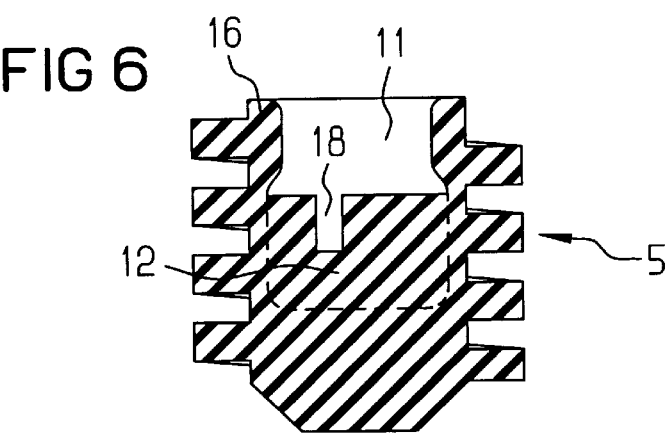
FIG. 6 the foot segment of FIG. 5 after clockwise rotation by 90° about the vertical longitudinal screw axis.

Moreover FIG. 6 shows a receiving groove 18 formed in the saddle rise 12, said groove 18 following assembly of the two shank segments 5, 6 receiving the ridge 14 in geometrically interlocking manner on account of the geometric interlock means. FIGS. 5 and 6 furthermore show the additional and complementing saddle-rider sub-system 18, 14 mounted eccentrically to the screw's center axis 19 (FIG. 4) and perpendicular to the irrotationality means in the radial plane, whereas the saddle-rider sub-system (12, 10) of the irrotationality means is configured to be center-symmetrical under load for reasons of strength and of stresses in the elastomer segment. The opposite displaceabilities of the two saddle-rider subsystems 12, 10 and 18, 14 provides further positive cooperation to further improve irrotational stability of both by geometrically interlocking mutually connected shank segments.

What is claimed is:

1. A screws comprising a head and a threaded shank including a head segment and a foot segment, said head segment being made of a dimensionally stable material and said foot segment being made of an elastomer material that extends approximately ⅓ to ⅔ of the total length of the shank, said threaded shank including a continuous thread along both the head segment and the elastomer material of the foot segment.

2. Screw as claimed in claim 1, wherein said dimensionally stable material is a plastic.

3. Screw as claimed in claim 1, wherein said head and foot segments are irrotationally connected to each other with complementary, geometrically interlocking engagement members.

4. Screw as claimed in claim 1, further including shape-complementing rotationally asymmetric projections and recesses formed in a junction surface of said head and foot segments, enabling flush assembly of said segments at a predetermined angular position to each other.

5. Screw as claimed in claim 1, wherein said continuous thread has a constant pitch.

6. A screw comprising a head and a threaded shank formed with a head segment and a foot segment, said screw being made of two different materials including an elastomer material in the foot segment and a dimensionally stable materia in the head segment, further including a center-symmetrical saddle-rider sub-system located at a junction surface between said foot and head segments to prevent relative rotational movement therebetween.

7. A screw comprising a head and a threaded shank formed with a head segment and a foot segment, said screw being made of two different materials including an elastomer material in the foot segment and a dimensionally stable material in the head segment, further including shape-complementing rotationally asymmetric projections and recesses formed in a junction surface of said head and foot segments, enabling flush assembly of said segments at a predetermined angular position to each other, wherein said projections and recesses include a tongue and groove arrangement proximate the junction surface and further including an eccentric saddle-rider sub-system in the junction surface.

8. A screw comprising a head and a threaded shank formed with a head segment and a foot segment, said screw being made of two different materials including an elastomer material in the foot segment and a dimensionally stable material in the head segment, further including a continuous thread which is a flat thread in the foot segment of the shank and a trapezoidal thread in the head segment of the shank.

9. In combination, comprising:

a first structural part;

a second structural part; and a screw connecting said first and second parts together, wherein said screw includes a head and a threaded shank formed with a head segment and a foot segment, said screw being made of two different materials including an elastomer material in the foot segment and a dimensionally stable material in the head segment, said elastomer material extending approximately $1/3$ to $2/3$ of the total length of the shank and being received in the second structural part and said dimensionally stable material being received in the first structural part, said threaded shank including a continuous thread along both the head segment and the elastomer material of the foot segment.

10. The combination of claim 9, further comprising a cup-shaped receiving bearing in the second structural part receiving said foot segment.

11. The combination of claim 9, wherein said second structural part is an automotive water radiator and said first structural part is body sheet metal of an automotive body.

12. A screw comprising a head and a threaded shank formed with a head segment and a foot segment, said screw being made of two different materials including a first material in the foot segment and an elastomer material in the head segment extending approximately $1/3$ to $2/3$ of the total length of the shank, and further including a continuously extending thread formed on both said head segment and the elastomer material of said foot segment along substantially an entire length of said shank.

* * * * *